United States Patent [19]

Yamagishi et al.

[11] Patent Number: 4,495,298

[45] Date of Patent: Jan. 22, 1985

[54] THALLIUM-CONTAINING OPTICAL GLASS

[75] Inventors: Takasi Yamagishi, Itami; Yukio Noguchi, Toyonaka, both of Japan

[73] Assignee: Nippon Sheet Glass Co., Ltd., Osaka, Japan

[21] Appl. No.: 377,246

[22] Filed: May 11, 1982

[30] Foreign Application Priority Data

May 12, 1981 [JP] Japan ................... 56/71122

[51] Int. Cl.³ .................... C03C 3/04; C03C 3/08; C03C 3/10; C03C 3/30
[52] U.S. Cl. .......................... 501/55; 501/60; 501/61; 501/62; 501/63; 501/64; 501/65; 501/66; 501/67; 501/68; 501/69; 501/70; 501/72; 501/73; 501/74; 501/75; 501/76; 501/77; 501/78; 501/79; 501/900; 501/903; 350/413
[58] Field of Search ............... 501/55, 60-70, 501/72-79, 900, 903; 350/175 GN, 413

[56] References Cited

U.S. PATENT DOCUMENTS

| | | | |
|---|---|---|---|
| 3,843,228 | 10/1974 | Yoshiyagawa et al. | 501/37 |
| 3,859,103 | 1/1975 | Yoshiyagawa et al. | 501/37 |
| 3,941,474 | 3/1976 | Kitano et al. | 65/3.14 |
| 4,177,319 | 12/1979 | Jahn | 501/900 |

*Primary Examiner*—Mark Bell
*Attorney, Agent, or Firm*—Wenderoth, Lind & Ponack

[57] ABSTRACT

A thallium-containing optical glass composition which comprises the following oxides in the indicated proportions in mole %: $SiO_2$ 35–80, $Tl_2O$ 1–30, $Tl_2O+R_2O$ (R being an alkali metal) 1–35, ZnO 0–35, $GeO_2$ 0–30, BaO 0–25, $TiO_2$ 0–20, MgO 0–20, $B_2O_3$ 0–less than 10, $ZrO_2$ 0–2, $Al_2O_3$ 0–8, SnO 0–5, CaO 0–10, SrO 0–10, PbO 0–10, $La_2O_3$ 0–5, $Bi_2O_3$ 0–8, and $Ta_2O_5$ 0–2, and satisfies the following relations:

$$5 \leq ZnO + GeO_2 + BaO + TiO_2 + MgO + B_2O_3 \leq 40,$$

$$0.1 \leq ZrO_2 + Al_2O_3 + SnO \leq 8,$$

and $$0 \leq CaO + SrO + PbO + La_2O_3 + Bi_2O_3 + Ta_2O_5 \leq 10.$$

10 Claims, No Drawings

THALLIUM-CONTAINING OPTICAL GLASS

This invention relates to a thallium-containing optical glass, and more specifically, to a thallium-containing optical glass suitable for use as a lens having a refractive index gradient.

It has already been known that a glass cylinder whose refractive index distribution continuously, and preferably parabolically increases or decreases radially outwardly from its axis exhibits the action of a lens like a concave lens or a convex lens (see U.S. Pat. No. 3,941,474).

In the present specification and the appended claims, a lens which shows such a refractive index distribution as above stated is referred to as a "lens having a refractive index gradient".

In regard to a method of producing lenses having a refractive index gradient, U.S. Pat. Nos. 3,923,486 and 3,859,103 disclose that a glass cylinder having a desired refractive index gradient is obtained by contacting a glass rod containing thallium with a source of an alkali metal ion, such as a molten salt of sodium or potassium to exchange the thallium ion in a portion nearer to its surface with a larger amount of an alkali metal ion. U.S. Pat. No. 3,859,103 discloses a matrix glass composition suitable for the production of such a lens having a refractive index gradient which comprises 50 to 70 mole% of $SiO_2$, 10 to 30 mole% of $B_2O_3$ and 1 to 25 mole% of $Tl_2O$ as main components, more specifically a composition comprising 55.9 mole% of $SiO_2$, 18.7 mole% of $B_2O_3$, 9.3 mole% of $Tl_2O$, 9.3 mole% of $Na_2O$ and 6.8 mole% of ZnO. This U.S. patent states that a lens having a refractive index gradient, i.e. a lens whose refractive index continuously decreases radially outwardly from the axis of a cylindrical glass rod, is produced by molding the aforesaid glass composition into a cylindrical glass rod 1.0 mm in diameter, dipping the glass rod in a bath of molten potassium nitrate ($KNO_3$) maintained at a temperature at which the viscosity of the glass is about $10^{10}$ poises, for a long period of time, for example for 200 hours, to exchange the thallium ion in the glass rod with a potassium ion, cutting the resulting glass rod to a thickness of, for example, about 4 mm perpendicularly to its axis, and polishing both its end surfaces to provide flat surfaces.

Conventional matrix glass compositions for production of lenses having a refractive index gradient, such as the one described above, have the defect that their surfaces undergo corrosion by a molten salt, such as potassium nitrate, used for ion exchange in the production of such lenses, and a devitrified material is formed on the glass surface owing to slight variations in the composition of the matrix glass or variations in the composition of the molten salt, and in some cases, this results in the crystallization of the entire glass.

It is an object of this invention therefore to provide a thallium-containing optical glass composition suitable for the production of lenses having a refractive index gradient, which is free from the aforesaid defects and has novel oxide constituents and proportions.

Another object of this invention is to provide a thallium-containing optical glass composition having excellent resistance to treatment with a molten alkali metal salt, which is suitable for producing a lens having a refractive index gradient having a thallium concentration progressively decreasing radially outwardly from the axis of the glass cylinder and an alkali metal concentration progressively increasing in that direction by treating the glass cylinder with a molten alkali metal salt, especially molten potassium nitrate.

Still another object of this invention is to provide a thallium-containing optical glass composition which does not cause the formation of a devitrified material on the glass surface nor crystallization of glass during ion exchange by using a molten alkali metal salt.

Generally, a thallium ion is less stable in glass and more volatile than alkali metal ions such as $Na^+$ or $K^+$. Thus, when the melting temperature is relatively high in the preparation of a thallium-containing glass composition, thallium volatilizes vigorously, and it is difficult to obtain a thallium-containing glass composition having a high $Tl_2O$ content and a uniform and high quality. Furthermore, because of its instability, the thallium ion tends to color or devitrify the resulting glass.

$Tl_2O$, therefore, is difficult to handle as a glass component.

If the volatilization of thallium during glass formation is reduced, a thallium-containing glass composition of higher uniformity can be obtained. On the other hand, since the amount of thallium volatilized increases exponentially with a rise in temperature, the decreasing of the melting temperature during glass formation is strongly desired in order to obtain a highly uniform thallium-containing glass composition.

In the ion exchange of thallium in the glass with an alkali metal, the temperature of the molten alkali metal bath and the time during which the matrix glass is dipped in the molten salt bath are controlled according to the desired refractive index distribution. If the temperature of the molten salt bath is increased, the rate of ion exchange becomes higher. Too high a temperature, however, is undesirable because it will result in softening and deformation of the glass rod to be treated. For this reason, the temperature of the molten alkali metal salt is usually adjusted to a temperature range within which the viscosity of the glass rod is usually about $10^{10}$ to about $10^{13}$ poises. If, however, this temperature is too high, some molten salts may undergo a decomposition reaction to hamper the ion exchange. Accordingly, glass compositions are sought in which the temperature range within which the viscosity of the glass composition is $10^{10}$ to $10^{13}$ poises corresponds substantially to a temperature range suitable for a given alkali metal salt, for example a range of 500° to 650° C. for $KNO_3$.

We have now found a thallium-containing glass composition which fully meets these requirements and has excellent resistance to molten alkali metal salts in the ion exchanging step and which scarcely undergoes devitrification at the glass surface or crystallization of the entire glass.

According to this invention, there is provided a thallium-containing optical glass composition which comprises the following oxides in the indicated proportions in mole%

| | |
|---|---|
| $SiO_2$ | 35–80 |
| $Tl_2O$ | 1–30 |
| $Tl_2O + R_2O$ | 1–35 |
| (R being an alkali metal) | |
| ZnO | 0–35 |
| $GeO_2$ | 0–30 |
| BaO | 0–25 |
| $TiO_2$ | 0–20 |
| MgO | 0–20 |
| $B_2O_3$ | 0–less than 10 |

-continued

| | |
|---|---|
| $ZrO_2$ | 0–2 |
| $Al_2O_3$ | 0–8 |
| $SnO$ | 0–5 |
| $CaO$ | 0–10 |
| $SrO$ | 0–10 |
| $PbO$ | 0–10 |
| $La_2O_3$ | 0–5 |
| $Bi_2O_3$ | 0–8 |
| $Ta_2O_5$ | 0–2 | and satisfies the following relations $$5 \leq ZnO + GeO_2 + BaO + TiO_2 + MgO + B_2O_3 \leq 40,$$

$$0.1 \leq ZrO_2 + Al_2O_3 + SnO \leq 8,$$

and $$0 \leq CaO + SrO + PbO + La_2O_3 + Bi_2O_3 + Ta_2O_5 \leq 10.$$

In the above composition, $SiO_2$ is used as a glass-forming component, and its proportion is 35 to 80 mole%, preferably 45 to 70 mole%, based on the entire composition. If the proportion is less than the specified lower limit, the resulting glass decreases in durability and stability. If it exceeds the upper limit specified, the melting temperature of the glass increases, or the required amounts of the other components cannot be secured, leading to a failure to achieve the objects of this invention. The most suitable proportion of $SiO_2$ is 55 to 70 mole%.

$Tl_2O$ is included in a proportion 1.0 to 30 mole%. If the proportion of $Tl_2O$ is below the specified lower limit, a lens having a refractive index distribution suitable for practical applications cannot be obtained. If it exceeds the upper limit, the durability of the resulting glass is reduced, or the resulting glass undergoes heavy coloration. The proportion of $Tl_2O$ is preferably 2.0 to 20 mole%, more preferably 3.0 to 17 mole%.

The alkali metal oxide $R_2O$ is used, as required, to improve the meltability of glass and adjust its viscosity. Examples of $R_2O$ are $Li_2O$, $Na_2O$, $K_2O$ and $Cs_2O$. $K_2O$ is most suitable in view of the durability of the resulting glass, the resistance of the glass to molten alkali metal salts in the production of lenses having a refractive index gradient, and the influences (devitrification) on the process of ion exchange. It is not always necessary to include such an alkali metal oxide in the glass composition of this invention, but its inclusion is desirable in order to increase the durability of the glass and reduce the tendency of the glass to be devitrified. Generally, it can be included in a proportion of 2 to 34 mole%, preferably 5 to 25 mole%. The proportion of $R_2O$ should be limited such that the total amount of $Tl_2O$ and $R_2O$ is 1 to 35 mole%, preferably 5 to 25 mole%, more preferably 10 to 25 mole%. If the proportion of $R_2O$ is below the specified lower limit, it is impossible to produce a lens having a refractive index distribution suitable for practical applications. If, on the other hand, it exceeds the specified upper limit, the melting temperature of the resulting glass is decreased, and the glass is easier to melt. But its durability is reduced and its tendency to be devitrified abruptly increases.

$ZnO$, $GeO_2$, $BaO$, $TiO_2$, $MgO$ and $B_2O_3$, either singly or in combination, serve to lower the melting temperature of the glass, broaden the glass-forming temperature range, and improve durability and resistance to devitrification.

$ZnO$ is included in a proportion of 0 to 35 mole%. $ZnO$ broadens the glass-forming temperature range, lowers the melting temperature of the glass and serves to improve the durability and devitrification resistance of the glass. If its proportion exceeds the specified upper limit, the temperature required for ion exchange during the production of lenses having a refractive index gradient becomes too high so that the durability of the glass is reduced. The preferred proportion of $ZnO$ is 5 to 25 mole%.

$GeO_2$ is included in a proportion of 0 to 30 mole%. $GeO_2$ produces an effect of broadening the glass-forming temperature range and lowering the melting temperature of the resulting glass. If its proportion exceeds the specified upper limit, evaporation of $GeO_2$ becomes vigorous and a homogeneous glass is difficult to obtain. Preferably, the proportion of $GeO_2$ is 3 to 15 mole%.

$BaO$ is used to broaden the range of the glass-forming composition and to improve the meltability of glass. If it is present in too large a proportion, ion exchange does not easily proceed during the production of lenses having a refractive index gradient, and the diffractive index distribution of the resulting lens becomes poor. Thus, it is used in a proportion of up to 25 mole%. The preferred proportion is 5 to 10 mole%.

$TiO_2$ is included in a proportion of not more than 20 mole%. It is a component which serves to lower the melting temperature of the resulting glass and broaden the glass-forming temperature range. If its proportion exceeds 20 mole%, the glass tends to be devitrified, or is heavily colored. The preferred proportion of $TiO_2$ is 3 to 15 mole%.

$MgO$ is included in an amount of not more than 20 mole%. If its proportion exceeds 20 mole%, the melting temperature and melt viscosity of the glass tend to become higher. The preferred proportion of $MgO$ is 5 to 15 mole%.

$B_2O_3$ is included in an amount of less than 10 mole%. The presence of $B_2O_3$ makes it easy to melt the glass. But if it is present in an excessive amount, striae will be formed owing to its volatilization, or it will promote volatilization of $Tl_2O$. Or it will increase the devitrifying tendency during ion exchange in the process of producing lenses having a refractive index gradient. Accordingly, the proportion of $B_2O_3$ should be below 10 mole%, preferably not more than 5 mole%.

It has been found in accordance with this invention that by using $ZnO$, $GeO_2$, $BaO$, $TiO_2$, $MgO$ and $B_2O_3$ either singly or as a combination of two or more of these, the melting temperature of the glass can be lowered, the glass-forming temperature range can be broadened, and the durability and devitrification resistance of the glass can be improved. One characteristic of the present invention is that $ZnO$, $GeO_2$, $BaO$, $TiO_2$, $MgO$ and $B_2O_3$ are included in a total proportion of 5 to 40 mole%, preferably 10 to 30 mole%. If the total proportion is below the specified lower limit, no effect of including these oxides is exhibited. If, on the other hand, it exceeds the upper limit, the glass melting temperature will be increased, or the durability and devitrification resistance of the glass will be impaired.

By including small amounts of $ZrO_2$, $Al_2O_3$ and $SnO$, either singly or in combination, the durability of the resulting glass to molten alkali metal salts can be markedly improved in processing the glass into lenses having a refractive index gradient, and it is also possible to improve the weatherability of glass obtained after treatment with a molten alkali metal salt.

$ZrO_2$ can be included in a proportion of not more than 2 mole%, preferably not more than 1 mole%. If its proportion exceeds 2 mole%, the glass tends to remain unmelted.

If the proportion of $Al_2O_3$ increases, the meltability of the glass is reduced. Therefore, its proportion is 8 mole% at the highest, and preferably not more than 5 mole%.

SnO can be included in a proportion of not more than 5 mole%, preferably not more than 3 mole%. If its proportion exceeds 5 mole%, the glass tends to be devitrified, and colored.

If the total proportion of $ZrO_2$, $Al_2O_3$ and SnO is too large, the meltability of the glass will be reduced, or its coloration will become heavy. Hence, as another characteristic of this invention, the total amount of $ZrO_2$, $Al_2O_3$ and SnO should be 0.1 to 8 mole%, preferably 0.5 to 5 mole%.

As shown in Examples to be given herein below, the thallium-containing optical glass of this invention exhibits an excellent performance, especially when it is processed into a lens having a refractive index gradient, by the combination of the glass components described hereinabove. It has also been found by the works of the present inventors that it is advantageous to include additional components, CaO, SrO, PbO, $La_2O_3$, $Bi_2O_3$ and $Ta_2O_5$, in the proportions shown below in addition to the above-described components.

CaO, SrO and PbO can be used either singly or in combination, in a proportion of not more than 10 mole%, preferably not more than 5 mole%. The total amount of these should be less than 10 mole%, and preferably not more than 5 mole%.

$La_2O_3$ can be included in a proportion of not more than 5 mole%, preferably not more than 4 mole%. $La_2O_3$ makes the melting of glass easy. If, however, its proportion exceeds 5 mole%, divitrification tends to occur.

$Bi_2O_3$ can be included in a proportion of not more than 8 mole%, preferably not more than 7 mole%. $Bi_2O_3$ is used to adjust the low-temperature viscosity of the glass. If its proportion exceeds the above-specified limit, the resistance of the resulting glass to molten alkali metal salts is reduced during the production of a lens having a refractive index gradient, and the glass is heavily colored.

$Ta_2O_5$ is used to facilitate the melting of $ZrO_2$. If it is present in too large an amount, the melting of the glass becomes difficult. Hence, it can be included in a proportion of not more than 2 mole%, preferably not more than 1.5 mole%.

If the total amount of CaO, SrO, PbO, $La_2O_3$, $Bi_2O_3$ and $Ta_2O_5$ is too large, the resulting glass is disadvantageous in regard to weatherability, meltability, coloration, etc. Hence, the total amount should be limited to not more than 10 mole%, preferably not more than 5 mole%. These additional components are optional components, and the addition of these may be omitted as required. This may be represented by $0 \leq CaO + SrO + PbO + La_2O_3 + Bi_2O_3 + Ta_2O_5 \leq 10$, preferably $0 \leq CaO + SrO + PbO + La_2O_3 + Bi_2O_3 + Ta_2O_5 \leq 5$.

It is also possible to include in the glass composition of this invention $As_2O_3$, $Sb_2O_3$, etc. either singly or in combination as a clarifying agent in an amount of not more than 0.5 mole%.

The glass composition of this invention composed of the aforesaid oxides can be produced by melting a mixture of the aforesaid oxides or the precursors thereof (such as carbonates and nitrates) at a temperature of 1200° C. to 1400° C. by means of an indirect electric heating furnace, a high-frequency heating furnace, a microwave heating furnace, a direct electrical heating furnace, etc.

The thallium-containing glass composition provided by this invention, as will be seen from Examples given hereinbelow, has a relatively low melting temperature (about 1200° to about 1400° C.) for glass formation and is of uniform quality. The temperature of the glass composition at which its viscosity becomes $10^{10}$ to $10^{13}$ poises (i.e., the temperature which becomes a standard for the temperature of a molten alkali metal salt during ion exchange in the production of a lens having a refractive index gradient from the glass composition) is within the range of about 500° C. to about 650° C. which is suitable for the alkali metal salt. Furthermore, the glass composition of this invention has excellent durability to molten alkali metal salts, and excellent resistance to devitrification, and is quite suitable for the production of lenses having a refractive index gradient.

A lens having a refractive index gradient can be produced from the glass composition of this invention by, for example, melting the glass composition in a quartz or platinum melting pot, drawing molten glass continuously little by little from a nozzle provided at the bottom of the pot, quenching the molten glass to mold it into a fibrous form, dipping the resulting glass fibers in a molten alkali metal salt for several tens of hours to one hundred and several tens of hours to exchange the ions in the glass with the ions in the molten salt, cutting the ion-exchanged glass fibers to a predetermined length, and polishing both ends of each cut piece into a parallel plane.

The following examples illustrate the thallium-containing optical glass composition of this invention more specifically.

EXAMPLES 1 TO 18 AND COMPARATIVE EXAMPLES 1 TO 3

As sources of the oxides shown in Table 1, the following raw materials containing the metals of the respective oxides were used.

Silica powder, thallium nitrate, lithium carbonate, sodium carbonate, potassium carbonate, cesium nitrate, barium nitrate, titanium oxide, zinc oxide, zirconium oxide, tin oxide, calcium carbonate, magnesium carbonate, strontium carbonate, lead oxide, lanthanum oxide, germanium oxide, boric acid, aluminum hydroxide, bismuth oxide, tantalum oxide, antimony oxide, and arsenic anhydride.

Predetermined amounts of these raw materials were weighed, and well mixed. The resulting mixture was put in a platinum melting pot and melted in an electric furnace at 1200° to 1450° C.

The molten mixture was well stirred to homogenize the glass, cast into a mold at 1100° to 1250° C., and annealed to give glass compositions having the properties shown in Table 1.

Table 1 summarizes the constituent proportions and properties of the resulting glass compositions.

In Table 1, the "yield point (°C.)" denotes the temperature which becomes a standard in ion exchange. It is measured by suspending a glass rod having a diameter of 4 mm and a length of 50 mm with one end supported, applying a load of 10 g on its lower end, heating the rod at a rate of 4° C./min., and recording the resulting elongation. The temperature of breakage of the rod is the yield point. Furthermore, at this temperature, the glass usually shows a viscosity of $10^{11}$ to $10^{12}$ poises.

The symbol "$\theta_c$" in Table 1 is a characteristic value showing the performance of a lens having a refractive index gradient which is obtained by subjecting glass to ion-exchange treatment for a predetermined period of time in a molten bath of potassium nitrate at a temperature in the vicinity of the yield point. Let the refractive index of a lens having a refractive index gradient be n(r) at a position spaced a distance r from the optical axis, and $n_o$ on the axis, then the refractive index distribution of this lens is approximate to the following equation.

$$n(r) = n_o \left( 1 - \frac{1}{2} g^2 r^2 \right) \quad (1)$$

The aperture angle of the lens having a refractive index gradient varies with the r value and reaches a maximum on the optical axis and zero in the peripheral portion of the lens. $\theta_c$ is the aperture angle on the optical axis and is given by the following equation.

$$\theta_c = \sin^{-1}(n_o \cdot g \cdot r_o) \quad (2)$$

where $r_o$ is the radius of the lens.

TABLE 1

| | Example | | | | | | |
|---|---|---|---|---|---|---|---|
| | 1 | 2 | 3 | 4 | 5 | 6 | 7 |
| Composition of glass (mole %) | | | | | | | |
| SiO2 | 75 | 60 | 60 | 60 | 50 | 40 | 60 |
| K2O | 6 | 11.5 | 17 | | 11.5 | | 3.5 |
| Tl2O | 6 | 8 | 7.5 | 10 | 7 | 10 | 16 |
| ZnO | 5 | 20 | | 29.5 | 30 | 14.5 | 20 |
| GeO2 | | | | | | 25 | |
| BaO | | | | | | | |
| TiO2 | | | | | | | |
| MgO | | | 15 | | | | |
| B2O3 | | | | | 1 | | |
| ZrO2 | 1 | 0.5 | 0.5 | 0.5 | 0.5 | 0.5 | 0.5 |
| Al2O3 | | | | | | | |
| SnO | | | | | | | |
| Li2O | | | | | | | |
| Na2O | | | | | | | |
| Cs2O | | | | | | 10 | |
| CaO | | | | | | | |
| SrO | | | | | | | |
| PbO | 7 | | | | | | |
| La2O3 | | | | | | | |
| Bi2O3 | | | | | | | |
| Ta2O5 | | | | | | | |
| Properties of glass | | | | | | | |
| Melting temperature (°C.) | 1350 | 1300 | 1400 | 1400 | 1300 | 1250 | 1300 |
| Yield point (°C.) | 545 | 625 | 590 | 693 | 649 | 572 | 580 |
| Refractive index (nd) | 1.603 | 1.614 | 1.588 | 1.644 | 1.631 | 1.674 | 1.712 |
| $\theta_c$ (degree) | 21 | 24 | 21 | 26 | 21 | 27 | 30 |

| | Example | | | | | | |
|---|---|---|---|---|---|---|---|
| | 8 | 9 | 10 | 11 | 12 | 13 | 14 |
| Composition of glass (mole %) | | | | | | | |
| SiO2 | 65 | 69 | 70 | 50 | 50 | 58 | 60 |
| K2O | 7 | 10 | | 10 | 10 | 11.5 | 11.5 |
| Tl2O | 12 | 9.5 | 29.6 | 10 | 9 | 7 | 8.5 |
| ZnO | | 8 | | 25 | | 15 | 11 |
| GeO2 | | | | | | | |
| BaO | | | | | 20 | | |
| TiO2 | 15 | | | | | | |
| MgO | | | | | | | 6 |
| B2O3 | | 2 | | | 8 | | |
| ZrO2 | 0.5 | 0.5 | 0.4 | | 1.5 | 0.5 | |
| Al2O3 | | | 1 | 5 | | | |

TABLE 1-continued

| SnO | 0.5 | | | | | | 3 |
|---|---|---|---|---|---|---|---|
| Li2O | | | | | | | |
| Na2O | | | | | | | |
| Cs2O | | | | | | | |
| CaO | | | | | | | |
| SrO | | | | | | 8 | |
| PbO | | | | | | | |
| La2O3 | | | | | | | |
| Bi2O3 | | | | | | | |
| Ta2O5 | | | | | 1.5 | | |
| Properties of glass | | | | | | | |
| Melting temperature (°C.) | 1300 | 1400 | 1250 | 1350 | 1250 | 1350 | 1300 |
| Yield point (°C.) | 561 | 576 | 475 | 576 | 523 | 552 | 655 |
| Refractive index (nd) | 1.682 | 1.604 | 1.763 | 1.639 | 1.684 | 1.613 | 1.638 |
| $\theta_c$ (degree) | 28 | 21 | 38 | 22 | 21 | 20 | 23 |

| | Example | | | Comparative Example | | |
|---|---|---|---|---|---|---|
| | 15 | 16 | 17 | 18 | 1 | 2 | 3 |
| Composition of glass (mole %) | | | | | | | |
| SiO2 | 50 | 56 | 57 | 51 | 59 | 60 | 59 |
| K2O | 10.5 | 16 | 3 | 30 | | | |
| Tl2O | 10 | 7 | 13 | 3 | 9 | 4 | 8 |
| ZnO | 15 | | 5 | 8 | 3 | 3 | 4 |
| GeO2 | | | | | | | |
| BaO | | | | | | | |
| TiO2 | | 6.5 | | | | | |
| MgO | | 14 | 5 | | | | |
| B2O3 | | | 5 | | 19 | 14 | 17 |
| ZrO2 | 0.5 | 0.5 | | 0.5 | | | |
| Al2O3 | | | | 2.5 | | | |
| SnO | | | 2 | | | | |
| Li2O | | | 7 | | | | |
| Na2O | 7 | | | | 10 | 19 | 12 |
| Cs2O | | | | | | | |
| CaO | 7 | | | | | | |
| SrO | | | | | | | |
| PbO | | | | | | | |
| La2O3 | | | | | 3 | | |
| Bi2O3 | | | | | | 5 | |
| Ta2O5 | | | | | | | |
| Properties of glass | | | | | | | |
| Melting temperature (°C.) | 1250 | 1300 | 1250 | 1200 | 1250 | 1250 | 1250 |
| Yield point (°C.) | 535 | 613 | 530 | 536 | 528 | 533 | 530 |
| Refractive index (nd) | 1.647 | 1.615 | 1.685 | 1.641 | 1.605 | 1.555 | 1.597 |
| $\theta_c$ (degree) | 23 | 22 | 26 | 19 | 26 | 20 | — |

Each of the glass compositions obtained in Comparative Examples 1 and 2 was molded into a glass rod 1 mm in diameter, and then dipped in a molten bath of potassium nitrate at 530° C. for 50 hours and 100 hours, respectively. It was determined that with these temperature and dipping time conditions, the optimum refractive index gradient was obtained in the glass compositions of Comparative Examples 1 and 2.

Glass rods obtained from the glass compositions of Comparative Examples 1 and 2 were respectively dipped for 50 hours and 100 hours in a molten bath of potassium nitrate in which 20 g, per kg of potassium nitrate, of glass had been subjected to an ion exchange treatment under the same conditions as above. The surface of the glass rod obtained from the glass of Comparative Example 1 was heavily corroded, and a devitrified material formed on the surface of the glass rod obtained from the glass of Comparative Example 2.

The glass composition of Comparative Example 3 was molded into a glass rod 1 mm in diameter, dipped for 40 hours in the same spent molten potassium nitrate as above at 530° C., and withdrawn. The glass rod was in the crystallized state.

Separately, the glass compositions of Examples 2 and 3 were each molded into a glass rod 1 mm in diameter, and dipped in a molten bath of potassium nitrate at 570° C. for 30 hours and 40 hours, respectively. It was determined that with these temperature and dipping time conditions, the glass compositions of Examples 2 and 3 give the optimum refractive index gradient.

The same glass rods as above molded from the glass compositions of Examples 2 and 3 were dipped for 30 hours and 40 hours, respectively, in a molten bath of potassium nitrate in which 20 g, per kg of potassium nitrate, of glass had been subjected to an ion exchange treatment under the same conditions as described above. No corrosion or devitrification was noted on the surfaces of these glass rods.

It is seen that at 570° C., the decomposition of the nitrate is vigorous, and the conventional glasses underwent surface corrosion within a short period of time, but the glass compositions of the invention showed resistance to the molten nitrate.

Using the glass compositions of the other Examples, the same experiment as above was conducted. It was determined consequently that these glass compositions had higher resistance to the molten alkali metal salt than those of Comparative Examples 1 to 3, and lenses having a refractive index gradient and the desired properties could be obtained without the formation of a devitrified material or crystallization of glass during ion exchange.

What we claim is:

1. A lens having a refractive index gradient, made of a thallium-containing optical glass composition which consists essentially of the following oxides in the indicated proportions in mole %

| | |
|---|---|
| $SiO_2$ | 35–80 |
| $Tl_2O$ | 1–30 |
| $Tl_2O + R_2O$ (R being an alkali metal) | 1–35 |
| $ZnO$ | 0–35 |
| $GeO_2$ | 0–30 |
| $BaO$ | 0–25 |
| $TiO_2$ | 0–20 |
| $MgO$ | 0–20 |
| $B_2O_3$ | 0–8 |
| $ZrO_2$ | 0–2 |
| $Al_2O_3$ | 0–8 |
| $SnO$ | 0–5 |
| $CaO$ | 0–10 |
| $SrO$ | 0–10 |
| $PbO$ | 0–10 |
| $La_2O_3$ | 0–5 |
| $Bi_2O_3$ | 0–8 |
| $Ta_2O_5$ | 0–2 | and satisfies the following relations $5 \leq ZnO + GeO_2 + BaO + TiO_2 + MgO + B_2O_3 \leq 40$, $0.1 \leq ZrO_2 + Al_2O_3 + SnO \leq 8$, $0 \leq CaO + SrO + PbO + La_2O_3 + Bi_2O_3 + Ta_2O_5 \leq 10$, and $0 \leq Li_2O \leq 7$, said lens having an aperture angle ($\theta c$) on its optical axis of not less than 19 degrees.

2. The lens of claim 1 wherein the glass composition comprises 2 to 20 mole % of $Tl_2O$.

3. The lens of claim 1 wherein, in the glass composition, $R_2O$ is $K_2O$ and is included in a proportion of 2 to 34 mole %.

4. The lens of claim 1 wherein, in the glass composition, the total proportion of $Tl_2O$ and $R_2O$ is in the range of 5 to 25 mole %.

5. The lens of claim 1 wherein the glass composition consists essentially of the following oxides in the indicated proportions in mole %

| | |
|---|---|
| $SiO_2$ | 45–70 |
| $Tl_2O$ | 2–20 |
| $Tl_2O + R_2O$ | 5–25 |
| $ZnO$ | 5–25 |
| $GeO_2$ | 3–15 |
| $BaO$ | 5–10 |
| $TiO_2$ | 3–15 |
| $MgO$ | 5–15 |
| $B_2O_3$ | 0–5 |
| $ZrO_2$ | not more than 1 |
| $Al_2O_3$ | not more than 5 |
| $SnO$ | not more than 3 |
| $CaO$ | not more than 5 |
| $SrO$ | not more than 5 |
| $PbO$ | not more than 5 |
| $La_2O_3$ | not more than 4 |
| $Bi_2O_3$ | not more than 7 |
| $Ta_2O_5$ | not more than 1.5. |

6. The lens of any one of claims 1 to 5 wherein the glass composition satisfies the following relations $10 \leq ZnO + GeO_2 + BaO + TiO_2 + MgO + B_2O_3 \leq 30$, $0.5 \leq ZrO_2 + Al_2O_3 + SnO \leq 5$, $0 \leq CaO + SrO + PbO + La_2O_3 + Bi_2O_3 + Ta_2O_5 \leq 5$, and $0 \leq Li_2O \leq 7$.

7. The lens of any one of claims 1 to 5 wherein the glass composition further comprises a clarifying agent.

8. The lens of claim 7 wherein the clarifying agent is selected from $As_2O_3$ and $Sb_2O_3$.

9. The lens of claim 7 wherein the proportion of the clarifying agent in the glass composition is not more than 0.5 mole %.

10. The lens of claim 1 wherein, in the glass composition, the amount of $B_2O_3$ is not more than 5 mole %.

* * * * *